(12) United States Patent
Chung et al.

(10) Patent No.: US 11,171,787 B2
(45) Date of Patent: Nov. 9, 2021

(54) BASEBOARD MANAGEMENT CONTROLLER WITH INTEGRATED RADIO FREQUENCY IDENTIFICATION INTERFACE

(71) Applicant: Hewlett Packard Enterprise Development LP, Houston, TX (US)

(72) Inventors: Yao-Huan Chung, Taipei (TW); Yulianti Darmanto, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 305 days.

(21) Appl. No.: 16/146,789

(22) Filed: Sep. 28, 2018

(65) Prior Publication Data

US 2020/0106622 A1  Apr. 2, 2020

(51) Int. Cl.
| | | |
|---|---|---|
| *H04L 29/06* | (2006.01) | |
| *H04L 9/32* | (2006.01) | |
| *G06K 19/077* | (2006.01) | |
| *H04W 4/80* | (2018.01) | |

(52) U.S. Cl.
CPC .......... *H04L 9/3242* (2013.01); *G06K 19/077* (2013.01); *H04L 63/062* (2013.01); *H04L 63/0853* (2013.01); *H04L 2209/24* (2013.01); *H04L 2209/805* (2013.01); *H04W 4/80* (2018.02)

(58) Field of Classification Search
CPC . H04L 9/3242; H04L 63/062; H04L 63/0853; H04L 2209/24; H04L 2209/805; G06K 19/077; H04W 4/80
See application file for complete search history.

(56) References Cited

U.S. PATENT DOCUMENTS

| | | | |
|---|---|---|---|
| 5,629,981 A | 5/1997 | Nerlikar | |
| 7,450,008 B2 | 11/2008 | Erickson et al. | |
| 8,274,366 B2 * | 9/2012 | Zaretsky | G06F 11/0706 340/10.1 |
| 8,344,853 B1 * | 1/2013 | Warner | H04L 63/08 340/10.1 |
| 9,125,050 B2 | 9/2015 | Taylor et al. | |
| 9,509,376 B2 | 11/2016 | Ahmed et al. | |
| 10,846,113 B1 * | 11/2020 | Trier | G06F 13/105 |
| 2006/0168644 A1 | 7/2006 | Richter et al. | |

(Continued)

OTHER PUBLICATIONS

Abdullah, S. et al.; "Integrating ZigBee-based Mesh Network with Embedded Passive and Active RFID for Production Management Automation"; Jan. 6, 2014; 3 pages.

*Primary Examiner* — Eleni A Shiferaw
*Assistant Examiner* — Stephanie S Ham
(74) *Attorney, Agent, or Firm* — Hewlett Packard Enterprise Patent Department

(57) ABSTRACT

A radio frequency identification interface integrated with a baseboard management controller is provided for secure data extraction from the baseboard management controller. The radio frequency identification interface includes a passive radio frequency identification circuit in direction communication with the baseboard management controller, an antenna to receive a radio-frequency signal when the baseboard management controller is in a standby powered-off status, and a connector to connect the radio frequency identification circuit to the antenna.

19 Claims, 5 Drawing Sheets

(56) References Cited

U.S. PATENT DOCUMENTS

| | | | |
|---|---|---|---|
| 2007/0069851 A1* | 3/2007 | Sung | H04L 9/3271 |
| | | | 340/5.1 |
| 2009/0298366 A1* | 12/2009 | Scarcello | B63B 22/02 |
| | | | 441/12 |
| 2011/0022524 A1* | 1/2011 | Monahan | G06Q 30/012 |
| | | | 705/302 |
| 2015/0365781 A1 | 12/2015 | Han | |
| 2018/0096151 A1* | 4/2018 | Ghetie | G06F 21/575 |
| 2018/0295012 A1* | 10/2018 | Viswanathan | H04L 63/08 |
| 2019/0122015 A1* | 4/2019 | Huang | G06K 7/10475 |
| 2019/0262981 A1* | 8/2019 | Sprenger | B25C 7/00 |
| 2019/0273798 A1* | 9/2019 | Lairsey | H04L 67/2833 |

* cited by examiner

BASEBOARD MANAGEMENT CONTROLLER WITH INTEGRATED RADIO FREQUENCY IDENTIFICATION INTERFACE

A computer device such as a server may include any number of identifiers and/or specifications, including for example, a model number, a serial number, product number, etc. Furthermore, these computer devices may include log data, i.e. a recordation of, events that occurred within the operating system or other software runs of the computer device, communication messages that may have passed between various devices or internal components of the server, communications between the server and users of the server, changes that occurred to stored data, etc. When maintaining or otherwise servicing a computer device, service engineers may rely on log data and/or device specifications for administration of service to the device.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
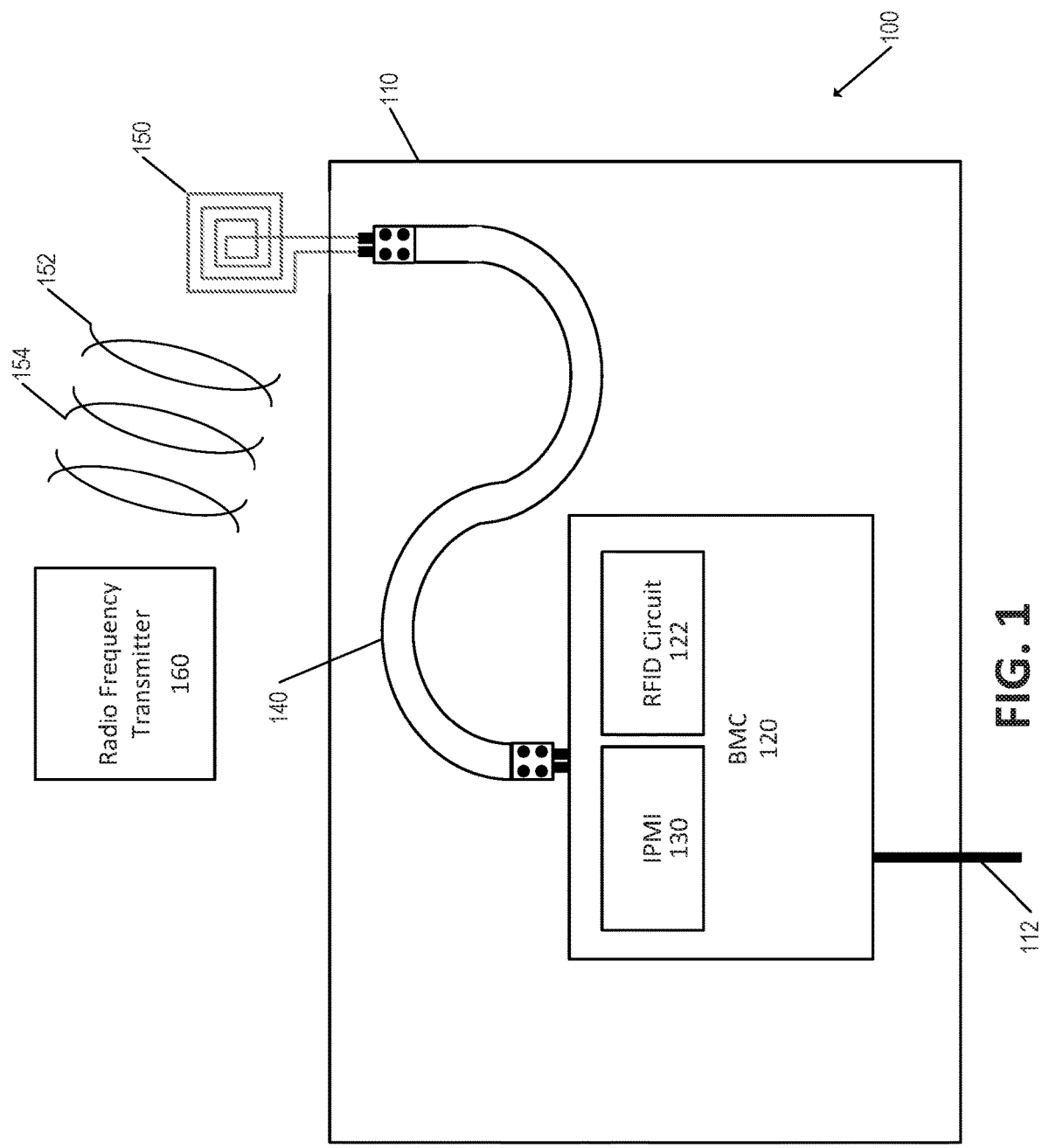
FIG. 1 is a block diagram illustrating an example system for retrieving computing device information via an integrated RFID interface.

A service engineer, when servicing a computing device within a data center, may seek to extract log data from the computing device, in addition to specifications of the device. To extract log data from the computing device, a service engineer may seek to extract the log data from a baseboard management controller (BMC) of the computing device.

A BMC is a controller that may interface between hardware of the server and system management software to monitor a physical state of the computing device. For instance, hardware sensors of the server may monitor the health, operating system (OS) status, power status, communication parameters, operating system function etc., of the server and report monitored data to the BMC of the server. The BMC may additionally collect other log data, such as event data and/or transaction log data. A BMC may be accessed i.e. by a system administrator through a connection that is independent of the CPU, firmware, and/or operating system of the computing device, such as a management network, to extract any log data collected by the BMC.

A BMC may include a system management interface, such as an Intelligent Platform Management Interface (IPMI) having system management and monitoring capabilities of the computing device independent of the operating system of the computing device. IPMI enables computer management capabilities even to a powered-off computing device by relying on a direct network connection to hardware, e.g. the BMC, of the computing device, rather than an operating system of the computing device. As will be described further below, IPMI may, in some examples, transfer static log data from the BMC to an RFID circuit when the BMC is in the standby powered-on status.

To extract log data, or any other system data collected by the BMC, a connection to the management network to which the BMC is connected may be established. The connection to the management network may be established by connecting to the BMC via an Ethernet port of the computer device. Unfortunately, these Ethernet ports are often rear ports located on the back of the machine, and may be difficult to access in a datacenter environment. Additionally, a datacenter may have a multitude of servers having many Ethernet cable connections, and it may be challenging for a system administrator to identify the Ethernet cable associated with the target computing device.

A service engineer, when servicing or otherwise maintaining a computing device in a datacenter, may seek product information of the computing device, e.g., a model number, a serial number, product number, etc. A physical label, containing relevant product information is often placed on a surface of a computing device chassis to identify the computing device. However, there is limited real estate on which to place such a product tag on a computing device chassis, and the product tag may consequently be placed on an air passageway, blocking airflow. These printed labels may also be damaged, destroyed, or misplaced after a certain period of time. Further, these physical labels may not contain dynamic information, such as data logs or current system versions.

FIG. 1 is a block diagram illustrating an example system 100 for retrieving computing device information via an integrated Radio Frequency Identification (RFID) interface. System 100 may include a BMC 120 located in a server chassis 110. In some examples, BMC 120 may be integrated into the motherboard of a server housed by chassis 110. BMC 120, when in a powered-on status, may receive power from an external source, and, when powered on, may pass data over a management network, e.g. via a connected Ethernet cable 112. In an example, IPMI 130 of BMC 120 may transfer static log data from the BMC to RFID circuit 122 (described below) when the BMC is in the standby powered-on status. BMC 120 may pass data when in a powered-on status, i.e. where the server in which BMC 120 is integrated is booted up and running, or when in a standby powered-on status, i.e. where the server in which BMC 120 is integrated is not booted up and running, but where BMC 120 is otherwise receiving power, e.g. via an external power source. Conversely, BMC 120, when in a standby powered-off status, may not pass data over the management network.

System 100 may further include an RFID interface integrated with, and/or otherwise in direct communication with, BMC 120. In some example implementations, RFID interface may include any of the following: an RFID circuit 122 integrated into BMC 120, an antenna 150, and a connector 140. In an example, passive RFID circuit 122 may be integrated into BMC 320. Passive RFID circuit 122 may store data collected by BMC 120. In an example, BMC 120 may include Intelligent Platform Management Interface (IPMI) 130 to transfer log data from BMC 120 to passive RFID circuit 122 when BMC 120 is in standby powered-on status. In an example, IPMI 130 may transfer log data from BMC 120 to passive RFID circuit 122 prior to BMC 120 switching to a standby powered-off status.

In an example, a connector 140 may connect RFID circuit 122 to antenna 150. Although antenna 150 is illustrated outside of chassis 110, antenna 150 may in some examples be disposed within chassis 110. In an example implementation, antenna 150 may be disposed within chassis 110, and may extend outside the housing of chassis 110. Antenna 150 may receive a transmitted radio frequency signal 152 and may transmit 154 a corresponding radio frequency signal 152 responsive to receipt of the transmitted radio frequency signal 152.

In some example implementations, antenna 150 may be included within an RFID tag, i.e. a housing secured to chassis 110 that may include antenna 150, and a means for collecting power from a radio frequency transmitter, e.g. radio frequency transmitter 160. Although RFID circuit 122 is illustrated in FIG. 1 within BMC 120, RFID circuit 122 may be included in the RFID tag, and, in some implementations, may be located outside of chassis 110. In this example implementation, RFID circuit 122 may be in direct communication with BMC 120 via connector 140.

The radio frequency signal 152 may be transmitted to antenna 150 by a radio frequency transmitter 160, e.g. a radio frequency identification (RFID) reader. Radio frequency transmitter 160 may transmit and receive radio waves to query passive RFID circuit 122, and to retrieve a query response that includes data stored on passive RFID circuit 122. Thus, radio frequency transmitter 160 may retrieve data stored within RFID circuit 122, including data passed from BMC 120 to RFID circuit 122.

In some example implementations, BMC 120 may include sensitive information, including, for example, event data and/or transaction log data. For instance, the extracted data may include a critical log, the critical log including a hardware model number, serial number, system hardware or system firmware configuration, error log data, any combination thereof, or any other forms of sensitive information. In some instances, authentication procedures may be utilized to ensure secure extraction of data from BMC 120.

Figure 2:
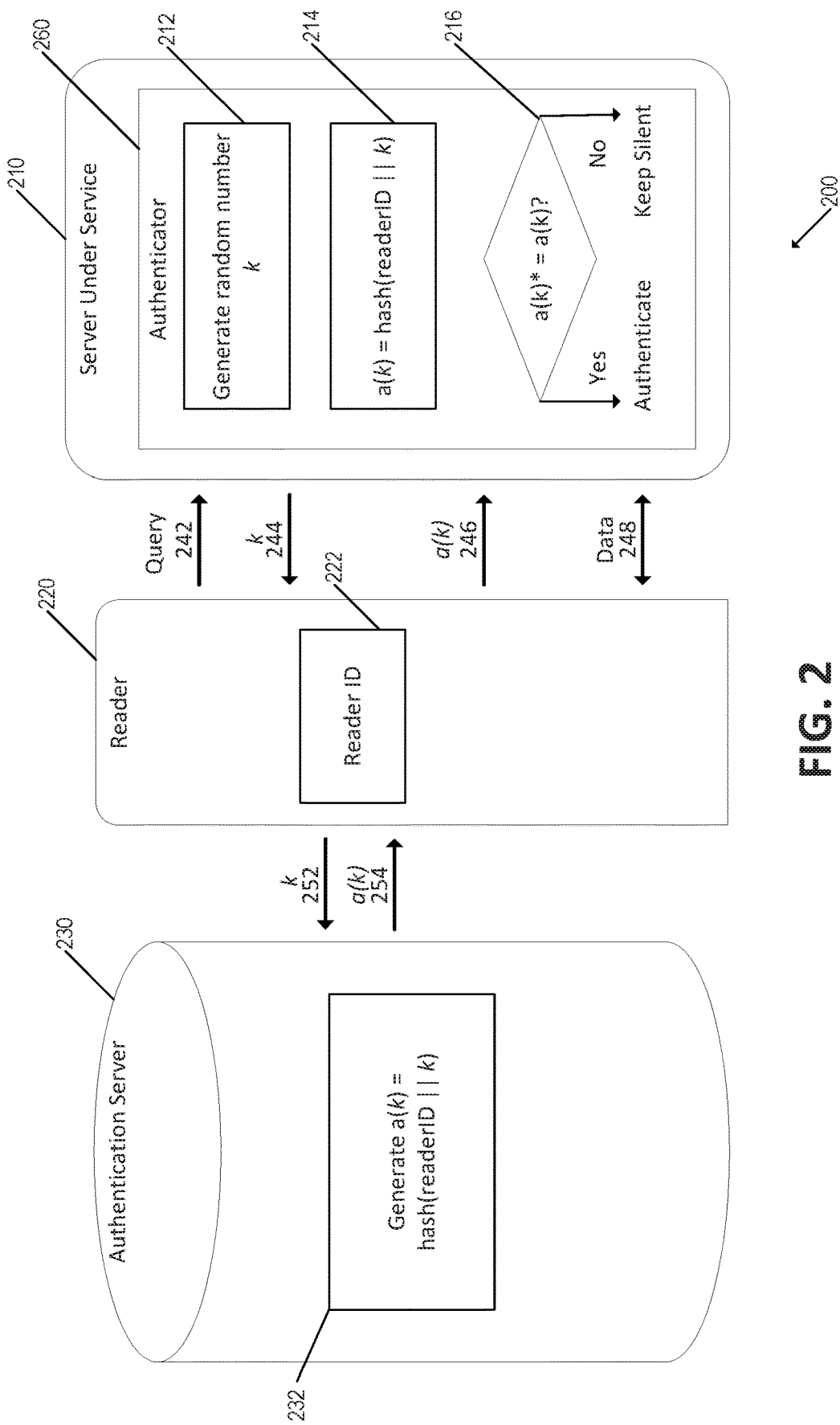
FIG. 2 is a block diagram illustrating a method for securely extracting data from a BMC via an integrated RFID interface.

FIG. 2 is a block diagram illustrating a method 200 for securely extracting data from a BMC via an integrated RFID interface. Method 200 may include a reader 220 transmitting a query 242 to a server under service 210. Reader 220 may include similar architecture and may otherwise function like that of radio frequency transmitter 160 of FIG. 1. Server 210 may include similar components to those depicted in FIG. 1, including a BMC, e.g. BMC 120, housed within a chassis, e.g. chassis 110, and having an Intelligent Platform Management Interface (IPMI), e.g. IPMI 130, a passive RFID circuit, e.g. RFID circuit 122, and a means for reading data stored on passive RFID circuit, including a connector, e.g. connector 140, and antenna, e.g. antenna 150. Server 210 may include an authenticator 260, which, in some examples, may be included in IPMI 130. Authenticator 260, in some examples, may be a secure gateway between the data stored on the RFID circuit and the data requester.

In an example implementation, authenticator 212, responsive to receiving query 242 from reader 220, may generate a key, in the form of a random number k 212, and may transmit 244 the randomly generated number k to reader 220. Reader 220 may pass 252 the randomly generated number k to an authentication server 230. In an example implementation, authentication server may be locked from use, and may call for access credentials from a user prior to unlocking, e.g. login credentials, access badge, password, any combination thereof, or any other means to enable secure access to authentication server 230. In another example implementation, the access credentials may be stored at reader 220 and may be automatically passed to authentication sever 230 upon passing randomly generated number k to authentication server 230. In yet another example implementation, reader 220 may include a reader ID 222 specific to reader 220, where the reader ID 222 is included in the generation of a hash value for authentication, as will be further described below.

Authentication server 230, responsive to receiving randomly generated number k, may generate 232 a hash value a(k) from randomly generated number k. In an example implementation, authentication server 230, responsive to receiving randomly generated number k, may generate 232 a hash value a(k) from randomly generated number k as well as from an identifier of reader 220. In an example, the generated hash value a(k) may be transmitted 254 to reader 220. However, in other example implementations, authentication server 230 may transmit 254 generated hash value a(k) to a device different from the device from which the randomly generated number k was received.

Reader 220 may pass generated hash value a(k) to server 210. Authenticator 260, like authentication server 230, may generate 214 a hash value a(k)* from randomly generated number k as well as from an identifier of reader 220. Authenticator 260, upon receipt of hash value a(k), may determine 216 whether hash value a(k) matches the hash value a(k)* that authenticator 260 generated. Where the hash values do not match, authenticator 260 may stay silent. In other words, authenticator 260 may not transmit a response to reader 220 responsive to receipt of hash value a(k). In another example, authenticator 260 may transmit a response to reader 220 that signifies the receipt by authenticator 260 of a non-matching hash value a(k).

Where the hash values do match, authenticator 260 may transmit a response to reader 220 that signifies the receipt by authenticator 260 of a matching hash value a(k). In some example implementations, authenticator 260 may transmit 248 any data queried by reader 220 to reader 220, i.e. data stored by RFID circuit 122 of FIG. 1. In another example implementation, authenticator 260, responsive to receipt of a matching hash value a(k), may enable reader 220 to transmit data to a BMC of server 210, or specifically, to an RFID circuit of server 210 to be stored and, in some examples, later retrieved by the BMC of server 210. Accordingly, data collected by a BMC may be securely retrieved via radio-frequency identification.

Figure 3:
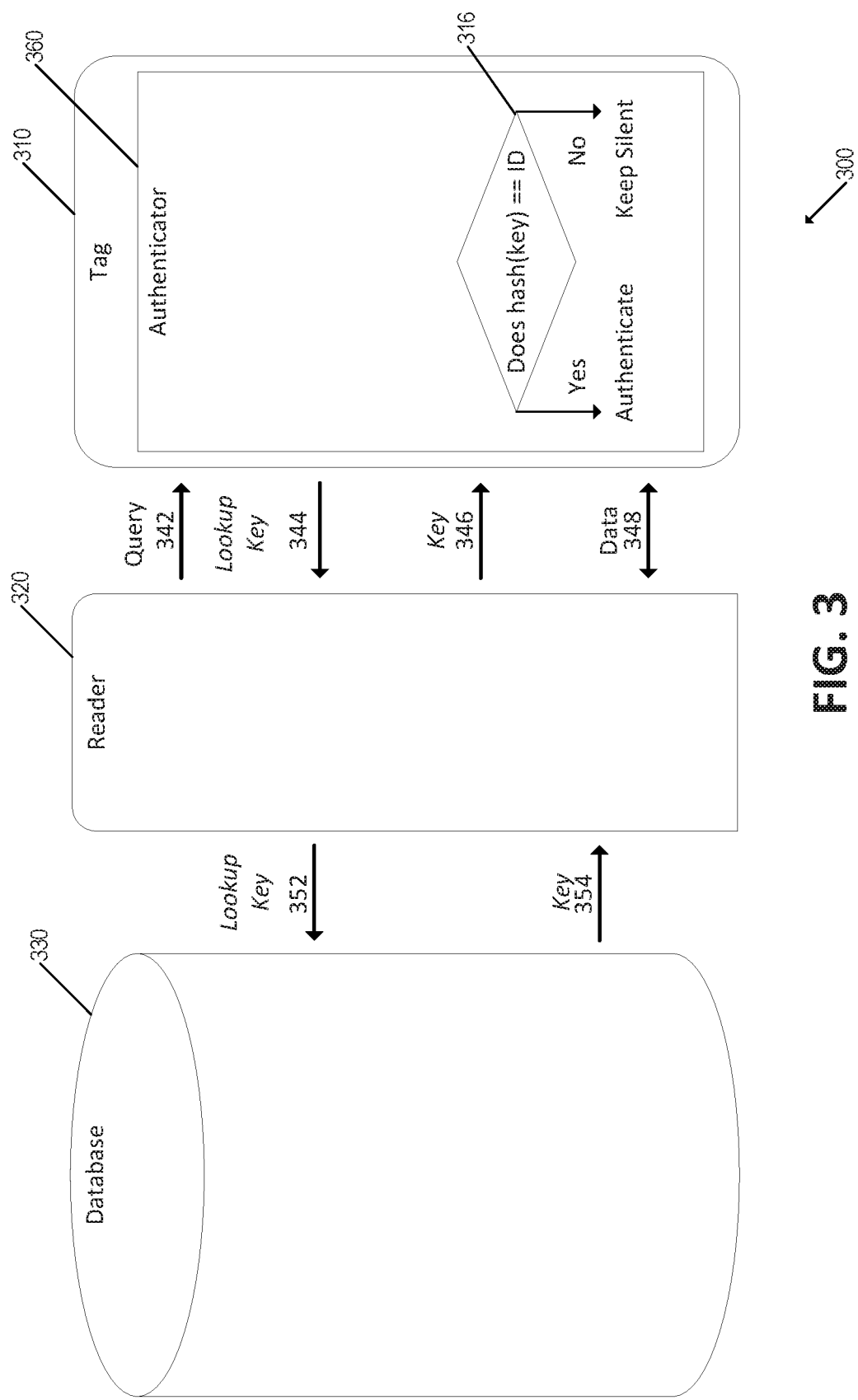
FIG. 3 is a block diagram illustrating another method for securely extracting data from a BMC via an integrated RFID interface.

FIG. 3 is a block diagram illustrating another method 300 for securely extracting data from a BMC via an integrated RFID interface. Method 300 may include a reader 320 transmitting a query 342 to an RFID tag 310. RFID interface may include tag 310. Tag 310 may be a label secured to an object such as a server chassis and may include, or otherwise be in direct communication with, similar components to those described above with reference to FIG. 1, including RFID circuit 122 and/or antenna 150. Tag 310 may be readable by example reader 320 provided proper authentication means are satisfied. In an example implementation, tag 210 may be integrated with BMC 120 such that BMC 120 may pass data to tag 310 to be stored at tag 310.

Like reader 220, reader 320 may include similar architecture and may otherwise function like that of radio frequency transmitter 160 of FIG. 1. Tag 310 may include an authenticator 360, which, in some examples, may be included in IPMI 130 of FIG. 1. Authenticator 360, in some examples, may be a secure gateway between the data stored at tag 310 and the data requester.

In an example implementation, authenticator 212, responsive to receiving query 342 from reader 320, may transmit a lookup key 344 to reader 320. Reader 320 may pass 352 the lookup key to database 330. In an example implementation, database may be physically located in a secure location that may be accessed with proper access credentials.

In another example implementation, the access credentials may be stored at reader 320 and may be automatically passed to database 330 upon passing the lookup key to database 330.

Database 330, responsive to receiving the lookup key, may use the lookup key to lookup a corresponding access key within the database. In an example, the access key may be transmitted 354 to reader 320. However, in other example implementations, database 330 may transmit 354 the corresponding access key to a device different from the device from which the lookup key was received.

Reader 320 may pass 346 the access key to tag 310. Authenticator 360 of tag 310 may generate 314 a hash value from the received key, and may compare the hash value to an identifier. Specifically, authenticator 360 may determine 316 whether the hash of the key matches the identifier. Where the hash does not match the identifier, authenticator 360 may stay silent. In another example, authenticator 260 may transmit a response to reader 220 that signifies the receipt by authenticator 260 of a non-matching key.

Tag 310 may transition from a lock state to an unlock state where the hash of the key does match the identifier. In an example implementation, authenticator 360 may transmit a response to reader 320 that signifies the receipt by authenticator 360 of a correct key. In some example implementations, tag 310 may transmit 348 any data queried by reader 320 to reader 320, i.e. data stored by RFID circuit 122 of FIG. 1. Reader 320, may thus securely access data of a BMC via integrated tag 310.

Figure 4:
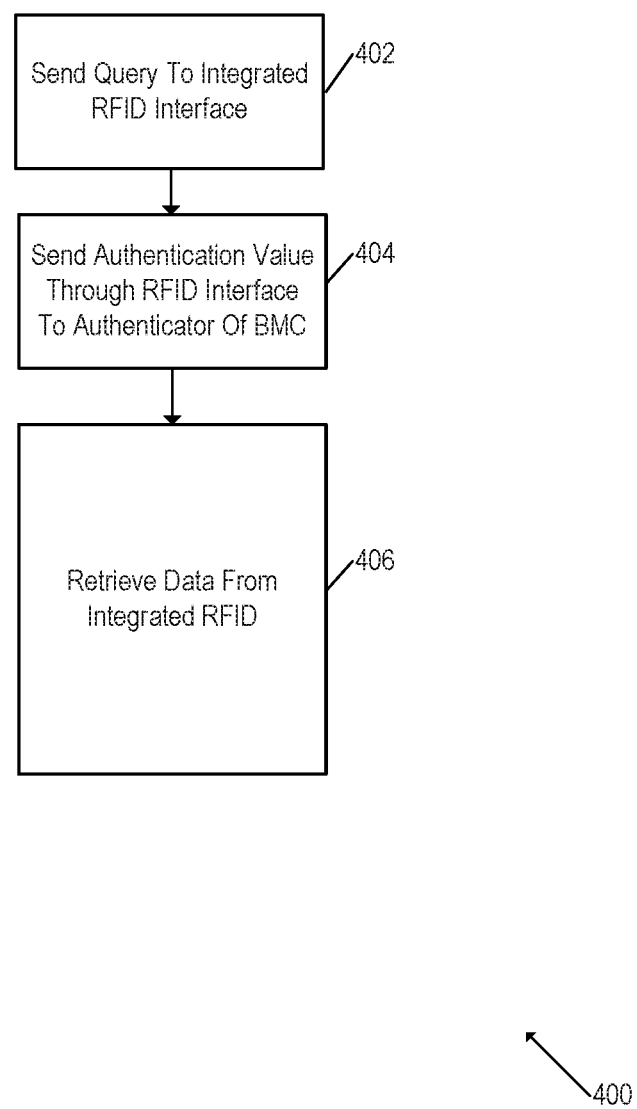
FIG. 4 is a flowchart illustrating a method for securely extracting data of a server from a BMC.

FIG. 4 is a flowchart illustrating a method for securely extracting log data of a server from a baseboard management controller (BMC). Although execution of method 400 is described below with reference to system 100, other suitable components for execution of method 400 may be utilized. Additionally, the components for executing method 400 may spread among multiple devices. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, a query may be sent to an integrated RFID interface. In an example, the query may be sent from a radio frequency transmitter, e.g. radio frequency transmitter 160 of FIG. 1. The query may be, for example, a request for data collected by a BMC of a target server, e.g. a server to be serviced. In some example implementations, the data collected by the BMC, e.g. BMC 120 of FIG. 1, is pushed to an RFID circuit of the integrated RFID interface, e.g. RFID circuit 122. The sent query may request the data stored at the RFID circuit.

In an example, the query may be sent to an antenna 150, and/or a tag including an antenna as described above. In an example, the query may be sent to an authenticator of the integrated RFID interface. At block 404, an authentication value may sent to the authenticator via the integrated RFID interface. In some example implementations, the authentication value may be a hash of a key received from an authentication server, or a key received from a lookup at a database.

At block 406, the requested data may be retrieved from the integrated RFID interface, and specifically, the RFID circuit, e.g. RFID circuit 122 of FIG. 1. In some example implementations, the data may be retrieved upon verification of the authentication value by the authenticator. In another example, data may be passed to integrated RFID interface, i.e. to be stored by the BMC and/or the RFID circuit, upon verification of the authentication value. Thus, data of the BMC may be securely retrieved from the integrated RFID interface.

Figure 5:
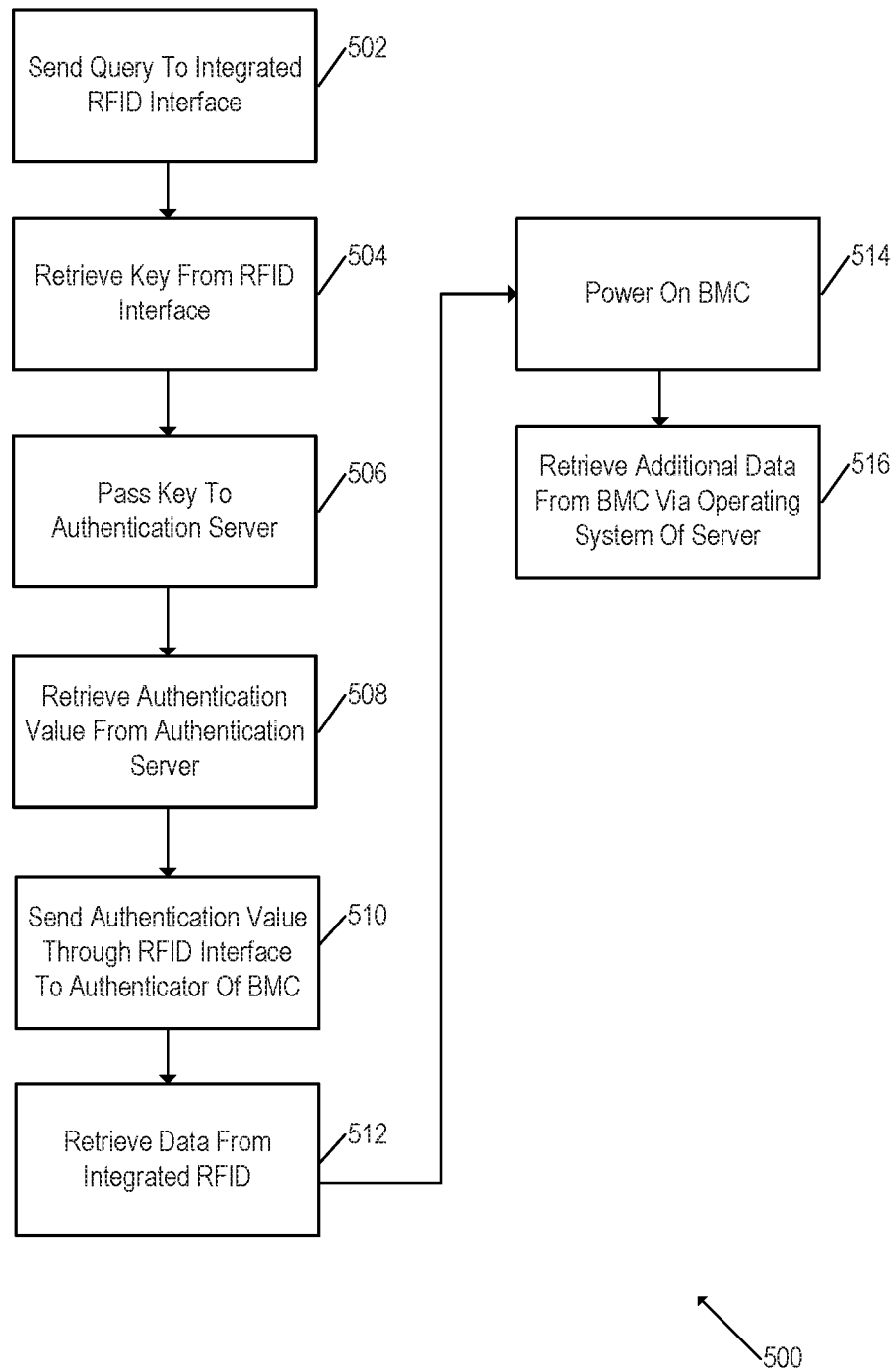
FIG. 5 is a flowchart illustrating another method for securely extracting data of a server from a BMC.

FIG. 5 is a flowchart illustrating another method for securely extracting data of a server from a baseboard management controller (BMC). Although execution of method 500 is described below with reference to system 100, other suitable components for execution of method 500 may be utilized. Additionally, the components for executing method 500 may spread among multiple devices. In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, a query may be sent to an integrated RFID interface. In an example, the query may be sent from a radio frequency transmitter, e.g. radio frequency transmitter 160 of FIG. 1. The query may be, for example, a request for data collected by a BMC of a target server, e.g. a server to be serviced. In some example implementations, the data collected by the BMC, e.g. BMC 120 of FIG. 1, is pushed to an RFID circuit of the integrated RFID interface, e.g. RFID circuit 122. The sent query may request the data stored at the RFID circuit.

As described above, the query may be sent to an antenna 150, and/or a tag including an antenna. In an example, the query may be authenticated by an authenticator of the integrated RFID interface. Specifically, an antenna, e.g. antenna 150, of the authenticator may transmit a radio-frequency signal of a key responsive to receiving the authentication value. In an example, the antenna may transmit the key to the source of the query, such as radio frequency transmitter 160 of FIG. 1. In some example implementations, the key may be a lookup key, and/or a key in the form of a randomly generated number.

At block 504, the key generated and/or transmitted by the authenticator may be retrieved from the RFID interface. At block 506, the key may be passed to an authentication server, and/or a database. In an example, the key may be passed to the authentication server upon transmission of proper login credentials, and/or any other example secure identifier to the authentication server. In some example implementations, the authentication server may, responsive to receiving the key, transmit an authentication value. The authentication value may be, in some examples, a hash of the key generated at the authentication server. In another example implementation, the key may be in the form of a lookup key, and a database may, responsive to receiving the lookup key, lookup and transmit a corresponding authentication value from the database.

At block 508, the authentication value may be retrieved from the authentication server. At block 510, the retrieved authentication value may be sent to the authenticator via the integrated RFID interface. At block 512, the requested data may be retrieved from the integrated RFID interface. In some example implementations, the data may be retrieved upon verification of the authentication value by the authenticator. For instance, the authentication value may be a hash of a key generated at the authentication server. The authenticator may independently generate a hash of the key, and may compare the independently generated hash value with the received hash. Where there is a match, the authenticator may satisfy the query by transmitting a radio-frequency signal of the queried data via an antenna, and/or may otherwise provide access to data stored at the RFID interface.

In some example implementations, any of blocks 502-512 may occur while the target BMC is in a powered-off status. In this example, data passed to, and stored on, an RFID circuit of the BMC, e.g. RFID circuit 122, may be retrieved. However, BMC may store additional data that was not passed to RFID circuit, e.g. dynamic event log data, transaction log data, etc. For instance, the additional data may include a BMC log, BIOS (Basic Input/Output System) log, hardware log, system event log, and/or any combination thereof.

At block 514, BMC may be powered on, e.g. the state of the BMC may be changed from a powered-off status, to a powered-on status. At block 516, additional data may be retrieved from the BMC while the BMC is in a powered-on status via an operating system of the target server. Thus, data may be securely collected from an integrated RFID interface while BMC is in a powered-off status, as well as directly from the BMC while the BMC is in a powered-on status.

While the above disclosure has been shown and described with reference to the foregoing examples, it should be understood that other forms, details, and implementations may be made without departing from the spirit and scope of this disclosure.

The invention claimed is:

1. A method comprising:
securely extracting data of a server from a baseboard management controller (BMC) of the server having an authenticator and an integrated RFID (Radio-Frequency Identification) interface by:
sending a query to the RFID interface;
sending an authentication value through the RFID interface to the authenticator of the BMC; and
retrieving the data from a passive RFID circuit of the integrated RFID interface, wherein the passive RFID circuit is integrated into the BMC.

2. The method of claim 1, wherein the BMC is powered off when retrieving the data from the integrated RFID interface.

3. The method of claim 2, further comprising:
powering on the BMC; and
retrieving additional data from the BMC via an operating system of the server.

4. The method of claim 3, wherein the additional data includes data from a BMC log, a BIOS (Basic Input/Output System) log, a hardware log, a system event log, or any combination thereof.

5. The method of claim 1, wherein securely extracting data of the server from the BMC further comprises:
retrieving a key from the RFID interface responsive to sending the query to the RFID interface;
passing the key to an authentication server; and
retrieving the authentication value from the authentication server.

6. The method of claim 5, wherein the authentication value is a hash of the key.

7. The method of claim 1, wherein the query is sent to the RFID interface via a radio frequency transmitter.

8. The method of claim 1, wherein the extracted data is of a critical log, the critical log including a hardware model number, serial number, system hardware or system firmware configuration, error log data, or any combination thereof.

9. A system comprising:
a baseboard management controller (BMC) of a server having a powered-on status, a standby powered-on status, and a standby powered-off status, the BMC further comprising an authenticator to receive an authentication value through an RFID interface; and
the RFID (Radio-Frequency Identification) interface in direct communication with the BMC to extract data from the BMC, the RFID interface comprising:
a passive RFID circuit in direct communication with the BMC, wherein the passive RFID circuit is integrated into the BMC;
an antenna to receive a radio-frequency signal from an RFID reader when the BMC is in the standby powered-off status; and
a connector to connect the passive RFID circuit to the antenna.

10. The system of claim 9, wherein log data is stored at the RFID integrated circuit.

11. The system of claim 10, wherein the BMC, when in the standby powered-on status, passes critical log data from the BMC to the RFID integrated circuit.

12. The system of claim 9, wherein the BMC includes an Intelligent Platform Management Interface (IPMI) to transfer static log data from the BMC to the RFID circuit when the BMC is in the standby powered-on status.

13. An apparatus comprising:
an RFID (Radio-Frequency Identification) interface including:
an RFID circuit integrated into a baseboard management controller (BMC), the RFID circuit to collect log data from the BMC;
a connector connected to the BMC at a first end and to an antenna at a second end; and
the antenna to transmit a radio-frequency signal of the collected log data.

14. The apparatus of claim 13, further comprising an RFID tag to store the collected log data when the BMC is in a powered-off status.

15. The apparatus of claim 13, wherein the RFID circuit is housed by a server chassis, and the antenna is configured to extend outside of the server chassis.

16. The apparatus of claim 13, wherein the antenna transmits a radio-frequency signal of collected log data responsive to receiving an authentication value.

17. The apparatus of claim 13, wherein the antenna transmits an RFID signal including a lookup value responsive to a query for the collected log data.

18. The apparatus of claim 13, wherein the BMC, when in a powered-on status, passes critical log data from the BMC to the integrated RFID circuit.

19. The apparatus of claim 13, wherein the log data includes data from a BMC log, a BIOS (Basic Input/Output System) log, a hardware log, a system event log, or any combination thereof.

* * * * *